United States Patent [19]
Falk

[11] Patent Number: 5,528,936
[45] Date of Patent: Jun. 25, 1996

[54] OPTOELECTRONIC SPATIAL ACCELERATION SENSOR

[76] Inventor: John E. Falk, 2815 Texas Ave., Simi Valley, Calif. 93063

[21] Appl. No.: 280,183

[22] Filed: Jul. 25, 1994

[51] Int. Cl.⁶ ..................................... G01H 9/00
[52] U.S. Cl. .................... 73/514.26; 73/655; 250/231.11
[58] Field of Search ............................. 73/653, 517 R, 73/514.26, 652, 655; 250/231.11, 231.19; 356/345, 363, 373, 375

[56] References Cited

U.S. PATENT DOCUMENTS

| | | | |
|---|---|---|---|
| 3,491,246 | 1/1970 | Dooley et al. | 250/231.19 |
| 3,961,185 | 6/1976 | Brokenshire et al. | 73/517 R |
| 4,592,235 | 6/1986 | Fink | 73/517 R |
| 4,719,800 | 1/1988 | Moser | 73/517 R |
| 4,792,931 | 12/1988 | Nishida et al. | 73/653 |
| 4,918,987 | 4/1990 | Vescial et al. | 73/517 B |
| 5,177,471 | 1/1993 | Horibata et al. | 250/231.19 |

Primary Examiner—Hezron E. Williams
Assistant Examiner—Richard A. Moller
Attorney, Agent, or Firm—Ladas & Parry

[57] ABSTRACT

An acceleration sensor device capable of a variant response to acceleration(s) as they may occur in all directions in any axis. The sensor may further discriminate, filter, or target a specific envelope of accelerations. Detection is accomplished through the means of an optoelectronic sensing device controlling an electronic circuit by a design-specific resilient member and associated counterweight. The sensor may be configured for a wide range of automatic responses and triggered circuit hold times, and may be automatically or manually reset to a static state.

16 Claims, 2 Drawing Sheets

OPTOELECTRONIC SPATIAL ACCELERATION SENSOR

BACKGROUND OF THE INVENTION

1. Field of the Invention

This invention relates to the field of acceleration detection and processing, and more particularly to an improved method and apparatus for the detection of acceleration forces in any spatial direction.

2. Description of the Prior Art

Detecting accelerations is a widely applied field with applications ranging from object motion to seismic acceleration monitoring. Sensors have therefore been in increasingly high demand. Most devices are designed for a specific purpose and have a particular reason for quantifying accelerations. Multi-direction acceleration sensing has heretofore been possible only by using a complex array of sensing devices whose outputs are processed in a similarly complex electronic processor.

Accordingly, by varying requirements, a need exists for a less complex single sensor device capable of detecting and/or discriminating certain individual acceleration levels, and/or discriminating a targeted spectrum of acceleration(s) as may spatially occur. As well, the need exists to manufacture such a device that may be adapted to a vast array of applications while maintaining a high level of reliability and offering longevity of service, ease of producibility, calibratable results, and low cost of production.

With respect to the world phenomenon known as earthquakes, various alarms and sensors have attempted, with some degree of success, to accurately detect seismic earth tremors for the purposes of warning and/or activating safety measures. Most prior art is particularly sensitive to motion accelerations along an individual plane, resulting in a high ratio of applied spatial acceleration(s) to geometrically triggered response, but only in that plane. However, as specific as seismic tremor waves may be, they may take many forms: complete randomized motions; planar motion; motion askew in any or all three dimensions; purely linear, perhaps vertical with respect to the earth's surface; and combinations of these motions. Additionally, accurate discrimination to only detect particular accelerations, such as caused by earthquakes, separate from other accelerations, such as caused by human intervention, wind, and other forms of vibrations, is difficult.

Most prior art includes a mechanical circuit employing a direct normally open contacting method to form a switching means. Upon the occurrence of an acceleration force, should the planar magnitude of the acceleration component be sufficient, the contacts of the switching means close. This method severely limits the activation characteristics of the system. It further yields a large exposure to environmental or electrical degradation of longevity, with reliability suffering as a result, regardless of the means taken to protect against such degradation.

The embodiment described by U.S. Pat. No. 4,764,762 specifically indicates that the spring's "predetermined range of motion" is "similar to a pendulum swing." A pendulum is constructed as a body suspended from a fixed support so that a weight swings freely back and forth under the influence of gravity, i.e. it pivots at the point of suspension. Though this approach is relatively effective to detect motions in a horizontal (x, y) plane, activity along the vertical (z) axis is ignored. Further, no means, other than the specific limit of an associated spring, controls the fixed ratio of acceleration-to-response, thus rendering this device unable to discriminate within a predetermined response envelope of acceleration, frequency, or other physical parameter involved. It is further limited by a high ratio of vectored x, y acceleration, under the influence of randomly directed accelerations, by the switching means being angularly oriented in the x, y plane.

With respect to object vibration detection, or such, apparatuses of the prior art are usually complicated and extremely costly. Though they may be target specific, most are constructed of single planar sensors mounted individually or in a multi-sensor arrangement aligned in the required planes, such that accelerations may be detected or monitored along one or several planes.

An incorporated means of discrimination, variably to a specific target envelope of acceleration(s), has heretofore not been proposed by the prior art in a single device.

SUMMARY OF THE INVENTION

The present invention overcomes the problems and deficiencies of the prior art by providing an improved acceleration sensor composed of a plurality of light source and light receiver sets disposed in spaced apart optical relation to one another. Each optical element of a light source/receiver pair is coaxially aligned optically facing its counterpart along the respective direct, refracted, or reflected axis. Refracted or reflected light paths may be desired in certain applications where space is too limited for establishing a direct light path; or as may be required to provide a more uniform response curve. A design-specific resilient member is affixed at one end to a support structure securely mounted to the body to be monitored. The resilient member is counterweighted at its free opposite end, and is constructed and located in its "at rest" position in a manner as to not optically obstruct or otherwise interfere with the axial flow of each light source to its respective receiver.

Then, an acceleration of the body being monitored, in any spatial direction or directions, is thus transferred to the resilient member which, in turn, causes a variable but limited amount of deflection of the resilient member, and also causes an interaction between the resilient member and it's associated counterweight.

Upon experiencing either a predetermined magnitude of acceleration, or repetitive predetermined accelerations of lesser magnitude, deflection of the resilient member and associated counterweight causes the appropriate light beam or beams to be broken due to obstruction or interference by the counterweight. The respective receiver's light disruption may then be electronically processed.

Discriminating the triggering threshold value of acceleration(s) is effected by means of the specific design and placement of the resilient member and it's associated counterweight, and/or, by electronic processing of the signals from the light receivers.

More specifically, the present invention is directed to an apparatus incorporating a resilient member and associated counterweight which by design may accordingly act, nullify, amplify, or otherwise reverberate in order to detect certain individual and/or a repetitive spectrum of acceleration or accelerations in any direction. Such detection may be for the purpose of alarming, indicating, warning, or actuating other systems.

The sensitivity for either vertical or horizontal acceleration components may be varied by altering the configuration of the component parts and/or structural design of the resilient member and its associated counterweight. The resilient member, which is preferably of a cylindrical, or helically wound, spring has the proper physical characteristics so as not to obstruct the beam of light flowing from each respective source to its related receiver. The resilient member will deflect in proportion to the applied acceleration and in the same direction of the applied acceleration, and may have notable reverberation characteristics with respect to frequencies of repeated accelerations. When an acceleration exceeding the desired threshold is sensed by the breaking of the respective light beam, a detection circuit is activated.

The more difficult design requirements are to discriminate against unwanted acceleration triggers, as well as to attain a multi-directional response curve. These requirements may be accomplished by the inherent reverberation characteristics of the interactions between the resilient member and its counterweight. This action and reaction is similar to that of the limited feedback loop of an electronic amplifier circuit. As may be applied trigonomically, the reverberate reactions caused by vibrating accelerations can supplement the sequentially applied acceleration forces. Therefore, the reaction of the resilient member to the first applied acceleration may either begin to nullify, or begin to amplify the response of the counterweight, dependent upon the predetermined response envelope. Ultimately, without regard to frequency, the spatially applied forces may be analyzed to produce a configurable trigger, thus resulting in a multi-directional curve of response. Adding the frequency parameter then makes the sensor more sensitive to accelerations experienced in a specific environment such as an earthquake environment.

As a result of the design of the resilient member and counterweight, a single spatial acceleration of A in distance d would trigger the subject sensor, and/or the same sensor could likewise trigger upon a repetitive reciprocating acceleration at a fraction of A at perhaps frequency f over time T. This type of discriminating is particularly applicable to accurate detection of seismic tremors and specific object vibrations.

An advantage of the present invention is the ability to discriminate as best as possible against such vibrations as may be induced by human and/or foreign objects. This is especially important in avoiding false alarms or otherwise unwanted circuit triggering. Another way of providing fail-safe alarms and triggering is by logically locating multi-sensors throughout or about the object to be monitored for acceleration(s), and connect the sensor output signals to a process control unit programmed with input-to-output triggering criteria. For example, in a large multi-story building structure, the differentiating of seismic tremor activity local to the structure would be more accurate with an array of the subject sensors affixed throughout the lower level of the building electronically reporting to an electronic processing unit. An apparatus arrangement such as this may be used to initiate the operation of safety equipment, switching controls for utility services, and other emergency notice and automations, but only if the sensor outputs at all locations reflect consistent acceleration activity, giving a high degree of discrimination against sensed acceleration activity only at a given locality. Unless there is consistency of response at all or a selected group of locations, the chances that the acceleration activity is seismic is nil. Further, the electronic processing process control unit may decide, according to predetermined parameters, that the array of sensor outputs fall into the statistical probabilities for a required triggering, as the case may be. It is important to note the "predetermined" envelope of triggered sensitivity has no specific definition. However, the envelope can be a specific resultant of the structural and dimensional design of the resilient member and counterweight combination, along with the preferable light flow paths or other means of triggering. The resilient member/counterweight combination may take on a variety of configurations but is preferably a flexible, resilient material whose interaction between the held (force applied) end and the movement reactive counterweighted end, produces an effect which may resonate, reverberate, or, similarly, harmonically amplify, nullify, or equally react in any direction as a result of the felt acceleration, to operate the sensor.

A yet further advantage of the present invention is the utilization of non-contact or indirect means of switching, preferably light emitters (e.g. LEDs) and light receivers, normally causing a closed circuit state during the stable and "at rest" sensor position, whereby a failure of the switching means may be constantly monitored. Thus, a typical component failure would result in an alarm/trigger, making obvious notice for repair. An external diagnostic monitor device may be incorporated to further fail-safe against false, or unwanted triggers.

BRIEF DESCRIPTION OF THE DRAWING

The invention will now be described in detail having reference to the accompanying drawings in which.

DETAILED DESCRIPTION OF THE PREFERRED EMBODIMENT

Figure 1:
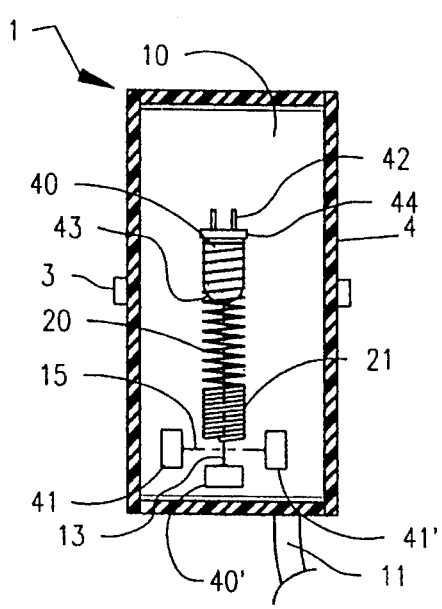
FIG. 1 is a front elevation cross sectional view of the optoelectronic spatial acceleration sensor according to the present invention, the view taken along the lines 1—1 of FIG. 4.

As shown in FIGS. 1 through 5, the present invention relates to an acceleration sensing device, hereinafter referred to as a sensor indicated by reference numeral 1. Sensor 1 includes a support structure in the form of housing 4 and printed circuit board 10, and a mounting facility defined by bracket 2 and strap 3. Sensor 1 may be affixed to an object or a surface to be monitored by means of the mounting facility 2, 3, thus providing a direct physical connection between the body to be monitored and the sensor 1. This connection will allow a 1:1 transfer of any motional forces the body may experience, for any reason, directly to the sensor 1. The transferred forces, controlled and, if required, discriminated against, can cause a limited range of motion of the counterweight 21 suspended from a resilient member shown in the drawing as spring 20. Should the limited range of motion of the counterweight 21 exceed and otherwise fall into the envelope of response, the appropriate light beam or beams 13, 15 from emitters 40 or 41 will be broken.

It should be understood that a sensor output can be generated without a complete interruption of the light beam between transmitter and receiver. Light receivers may respond to a diminished reception of light, if desired, thereby providing an output signal proportional to the amount of light impinging on the receiver. Also, if desired, the light beams may be of large diameter to enhance the range of proportional output of the light receivers. Lenses and mirrors (not shown) may be employed in such a case, the arrangement of which would be self-evident to one of ordinary skill in the optical art.

Figure 3:
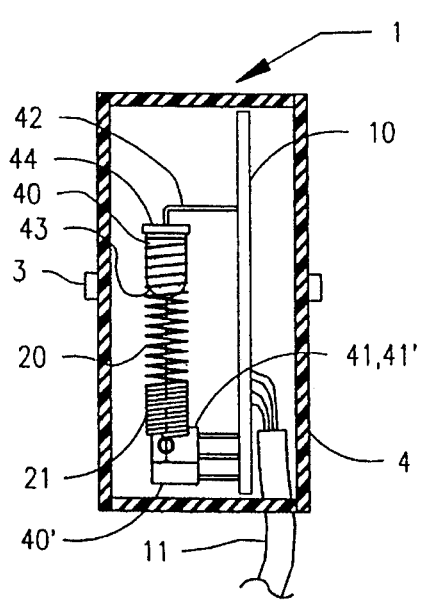
FIG. 3 is a side elevation cross sectional view of the sensor according to the present invention, taken along the lines 3—3 of FIG. 2.

With particular reference to FIGS. 1 and 3, the sensor 1, in a preferred embodiment, includes a compact cylindrical plastic housing 4, preferably hermetically sealed, which contains and supports a printed circuit board 10 internal to housing 4 by means of adhesive material (not shown). The mounting of printed circuit board 10 to the housing 4 may be implemented in any number of ways which would result in a high degree of mechanical energy transfer from housing 4 to circuit board 10 and, in turn, to the components mounted on circuit board 10.

The light emitter 40 in the example shown is an LED device which typically has a rounded nose portion 43 and a rear flange 44. The leads 42 of LED 40 are bent at a 90° angle with the free ends thereof soldered to the printed circuit board 10 and with the nose of the LED pointing downwardly in the embodiment of FIGS. 1 and 3.

The resilient member 20 of the example of FIGS. 1 and 3 comprises a helical spring wound of extremely fine hair-like wire, and the counterweight 21 is shown as comprising a tightly wound helical spring member. Although counterweight 21 may be configured in a variety of forms, such as a hollow cylindrical member, the choice of a tightly wound spring serves at least two important purposes in the present invention.

First, the extreme sensitivity of the sensor 1 requires exact tolerances on spring tension, spring length, and weight of the counterweight 21. Due to manufacturing tolerances, these critical parameters may vary and combine to create unacceptable error. By forming counterweight 21 as a tightly wound helical spring, it is a simple matter to adjust the balancing the weight of the sensor in its quiescent or "at rest" position by simply snipping off a small length of the counterweight spring element at the bottom thereof.

Secondly, due to its round dimensioning, it provides for uniform vertical axis optical porting and therefore a uniform circular response curve for any activity tending to move counterweight 21 laterally of its "at rest" axis.

The upper end of spring 20 is easily fixed to align with the optical axis of LED 40 by designing the spring to have a diameter at its top end just slightly smaller than the diameter of the nose 43 of LED 40. By pushing the nose 43 into the top end of spring 20 and, if needed, rotating it in a direction counter to the direction of winding of the helical wire comprising spring 20, the upper end of spring 20 can be easily and quickly set into its operative position with minimum labor and low associated manufacturing costs. For additional security, a drop of adhesive material may be applied to the end of spring 20 adjacent flange 44 of the LED 40.

The spring diameter of counterweight spring 21 is shown to be the same as resilient spring 20. However, in the event that the bottom end of counterweight 21 must be smaller in diameter in order to increase the sensitivity of the sensor to forces which cause counterweight 21 to move sufficiently horizontally to break the light path 13 from LED 40 to receiver 40', counterweight spring 21 may be wound so that the bottom few windings of counterweight spring 21 will break the vertical light path 13 with less lateral force or force components than with a counterweight spring 21 of constant diameter. The top windings of such modified counterweight 21 will still be cylindrical so as to conveniently and operatively connect to the bottom of resilient spring 20 as hereinbefore described.

The placement of LEDs 40 and 41 and their respective light receivers 40' and 41' the spring characteristics of resilient spring 20, and the weight of counterweight 21, may all be derived by empirical analysis. Once derived, however, repetitive manufacturing processes will result in nearly identical response characteristics of sensor 1 due to the simplicity of the design and the ability to make minor alterations as to counterweight position and weight as described above. Additionally, once the envelope of response is empirically determined, a seismic simulator, or other vibrating-mass instrument can be used to quality test and/or adjust the response envelope for each sensor produced.

Figure 2:
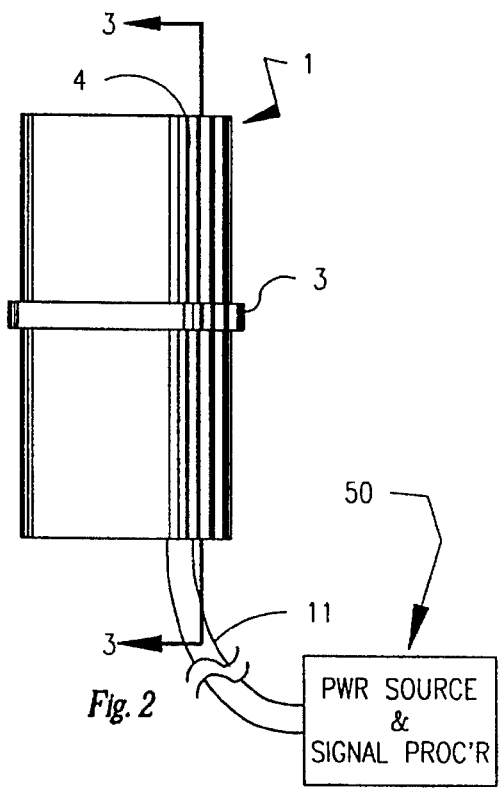
FIG. 2 is a front elevation view of the assembled sensor showing the front of the housing and a depending cable to a power source and signal processor.
Figure 4:
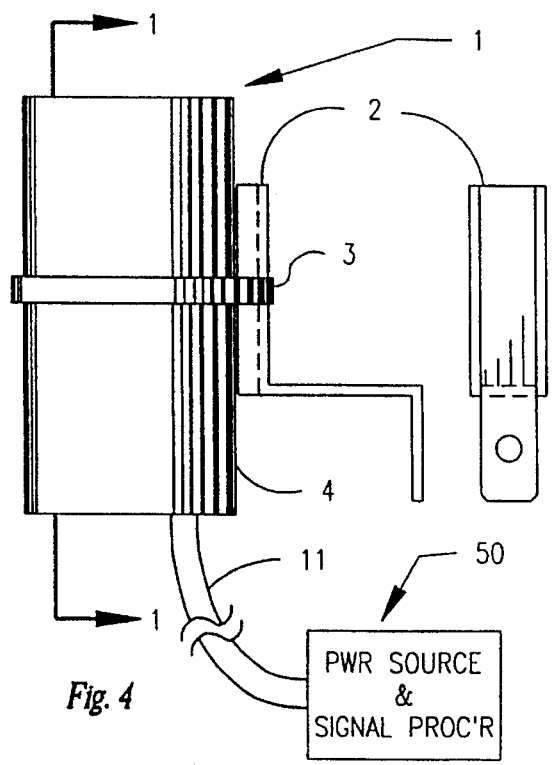
FIG. 4 is a side elevation view of the fully assembled sensor showing the side of the housing, a depending cable to a power source and signal processor, and a mounting bracket for fixing the sensor to a body being monitored.
Figure 5:
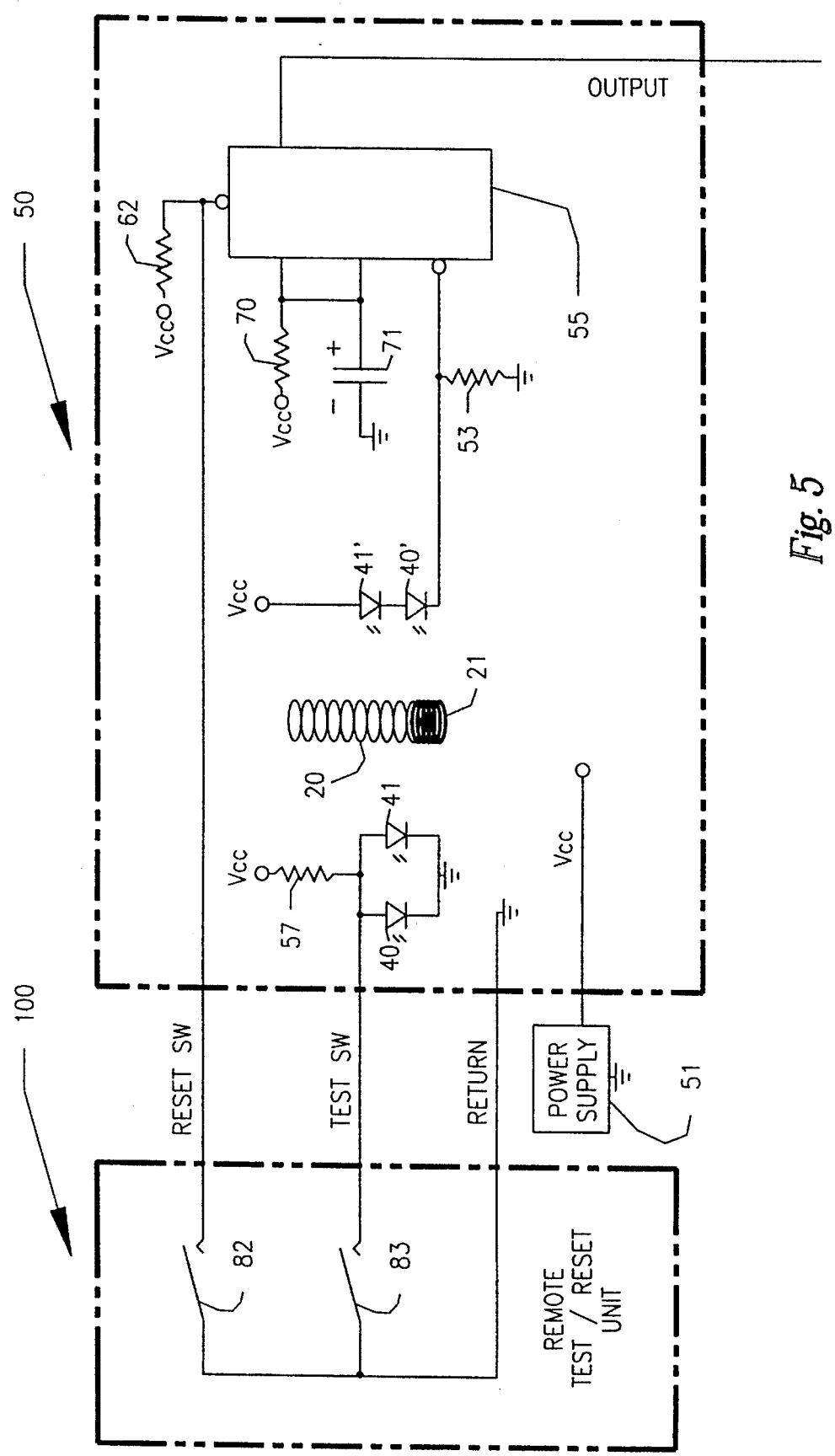
FIG. 5 is a circuit/block diagram of a subsystem including the sensor of the present invention and the electronics employed for interfacing the sensor with an external using device.

Reference is now made to FIG. 5 showing the details of the circuit/block diagram of the power source and signal processor 50 connected by cable 11 to sensor 1 as shown in FIGS. 2 and 4. For convenience, light transmitters 40,41 and light receivers 40',41' are shown connected to the functional elements with which they are associated, but in practice these elements 40,41,40',41' are preferably physically removed from the power source and signal processor 50, and communication is provided through cable 11. Alternatively, and as can be appreciated by reference FIG. 5, all of the components shown can, if desired, be contained in a single housing.

In the static or otherwise "at rest" position of counterweight 21, an electrical DC current flows from a power source 51, forward biasing the LED light sources 40,41; and, through the plurality of light receiver switches (two of which are shown at 40' and 41' in the embodiment of FIGS. 1 and 3), and through bias resistor 53 to ground, causing a voltage drop across resister 53. Receiver switches 40' and 41' are connected in series and operate in the circuit in the normally closed condition, to thereby dissatisfy (not trigger) the "low" trigger input to the latch timer 55. The output of the latch timer 55 is normally held to a "low" or "off" state during the sensor "at rest" period, defining a "static output" for the power source and signal processor 50. Upon movement of the counterweight 21 to a point where it may (described in greater detail below in this section) break any light emitter's (40 or 41) beam, the related light receiver (40' or 41') will then open the normally closed series circuit input to latch timer 55 and bias resistor 53, allowing the input bias resistor 53 to satisfy the "low" trigger input requirement of latch timer 55, thus triggering the latch timer 55. Once the latch timer 55 is triggered, its output timing (pulse width) is controlled by its external electronic components 70,71 by known design techniques. If included, an incorporated SPST normally open relay contact may serve as a buffer means for providing external electrical monitoring and/or signal transfer of the operation of receivers 40', 41' through the external connecting cable 11 to processor 50.

Once the body being monitored has returned to the static position prior to the applied forces and has been "at rest" for a period of time that exceeds the duration of the latch timer 55, (as specified by it's external components 70,71 determined accordingly by the desired application criteria) the circuit returns to it's static condition to provide the aforementioned "static output".

A remote test/reset unit 100 is provided for the wired connection of external testing and resetting operations, as shown in FIG. 5. If optionally installed, this unit provides test and reset functions without affecting the normal operations mentioned herein regarding sensor 1. If installed, an external circuit normally open momentary SPST test switch (shown in FIG. 5 as switch 83) is connected in parallel to the light emitters 40,41. Once manually depressed (for testing purposes), the current flow through the light emitters 40 and 41 is shunted to ground. This causes a simulated "obstruction of the light beams" to both light receivers 40' and 41' triggering the latch timer 55 explained above. Likewise, a second and similar switch 82, if installed and properly connected provides a means of manually resetting the term of the latch timer's triggered pulse width. Statically and normally, the "reset low" input to pin 4 of latch timer 55 is held dissatisfied by bias resister 62 connected to $V_{cc}$. Provided the latch timer 55 is operating in the triggered state, manually depressing the reset switch 82 applies a ground or "low" potential at the "reset" normally "low" input of the latch timer 55.

The limited range of motion of the counterweight 21 may be controlled for the purpose of filtering and/or discriminating against undesired response triggers. This may be accomplished by varying the structural, dimensional, and configurational design of the relationship between the resilient member 20 and it's counterweight 21. This may also be accomplished by an external electronic process control unit, using the sensor 1 or an array of sensors 1 as signal input. A combination of both methods mentioned above may also be utilized. The sensor 1 may be hermetically or otherwise sealed for outstanding reliability regardless of the normal variations in the environment.

EXAMPLES

With respect to the present invention designed specifically for the purpose of earthquake detection, which is accordingly manufactured and affixed to a wall surface of a dwelling structure, the following example data will result (though the threshold of the triggering seismic magnitude sensitivity may be varied by design):

1. A single cycle of motion, i.e. a single applied impact from any source for any reason, of 0.080" displacement in 0.10 seconds, would not trigger the device, i.e. neither light beam 13, 15 will be broken. Such a motion could perhaps result from a human accidentally falling or accidentally bumping against the wall upon which the sensor is mounted. Triggering would not occur because the motion force applied to the fixed end of the resilient member 20 would displace and return prior to the counterweight's 21 delayed reaction. This is a result from a ratio of the applied spring member's 20 designed resiliency to the weight of counterweight 21. Additionally, the aperture of the porting member, which in this case is the hollow cylindrical counterweight 21, is designed to be larger than the cross section of the focused light beam 13, thereby allowing a certain limited range of lateral motion of the counterweight 21 prior to obstructing or interfering with light beam 13.

2. A single cycle of motion, caused for any reason, of 0.095" displacement in 0.10 seconds, would trigger sensor 1. Such a motion could accidentally occur from non-seismic activity, although this would be highly unlikely for substantial walls. Regardless, a motion such as this causes a 0.095" displacement of the fixed end of the resilient member 20, and the light beams 13 and 15, thus violating the aperture of the porting member, which in this case is the counterweight 21, and causes an obstruction or interference with a light beam or beams 13, 15, thereby triggering the latch timer 55.

3. A repetitive motion force of as little as 0.010" at 2 Hz for at least 5–7 cycles would also trigger sensor 1. Such a characteristic of motion would most typically result from some sort of seismic activity. This trigger would result from the reverberating actions between the resilient member 20 and counterweight 21. These actions and reactions are similar to a springy and bouncy response of a weight dangled on a spring, where small motions are applied at the held end, and the weight's motions bounce and spring back and forth more and more with respect to each newly applied cycle of motion. At a point, the motion of the weight is larger than the applied motion of any one cycle, though limited and controlled. Of course, the range of the triggerable ratio between the frequency and displacement can be varied by design to take on the form of a specific envelope of response targeted by the purpose of detection.

4. It is important to correlate the magnitude, duration time, and frequency of acceleration applied to the sensor with the resiliency and displacement characteristics of the spring and weight. In a preferred embodiment of the invention, the sensor 1 will provide an output for an applied displacement of the sensor 1 for single impact displacement above 0.090" within a range of 1 microsecond to 0.5 seconds, and for multiple impact displacements above 0.005" at a frequency in the range of 2 to 25 impacts or displacements per second. The DC source supply may be a power supply deriving its energy from AC power lines, or it may be a self-contained battery for wireless signal transmission, or it could be a combination of these two sources depending upon need. A combination power source, for example, includes a rechargeable battery and a battery charger circuit.

Changes may be made in the construction and the operation of the various components and assemblies described herein, and changes may be made in the sequence of steps of the procudures outlined and described herein, without departing from the spirit and the scope of the invention as defined in the following claims.

I claim:

1. An acceleration sensor, comprising:

a resiliently suspended counterweight movable in all spatial directions under the influence of an applied acceleration;

a first optoelectronic light producing means for producing a first light beam; and a second optoelectronic light producing means for producing a second light beam;

said resiliently suspended counterweight being configured and positioned relative to said first and second light beams to interfere with said first light beam responsive to movement of said counterweight substantially in a predetermined plane, and to interfere with said second light beam responsive to movement of said counterweight in directions angular to said predetermined plane; and means responsive to the interference of said first and second light beams for producing a sensor output signal.

2. The sensor as claimed in claim 1, wherein said resiliently suspended counterweight comprises:

a fine wire helical spring member having a fixed end and a free end; and a weight coupled to said spring member free end.

3. The sensor as claimed in claim 2, wherein:

said fine wire helical spring member defines a first spring member; and said weight comprises a tightly wound second helical spring member, said second spring member being coupled to said free end of said first spring member by the intertwining of overlapping convolutions of the two spring members.

4. The sensor as claimed in claim 2, wherein said weight is of hollow cylindrical construction, and said first light producing means directs said first light beam axially through said fine wire helical spring member and axially through said hollow cylindrical weight.

5. The sensor as claimed in claim 4, wherein:

said first light producing means is a light emitting diode having a cylindrical body; and said helical spring member has its fixed end wound about said cylindrical body.

6. The sensor as claimed in claim 4, wherein said second light producing means is a light emitting diode positioned off axis of said hollow cylindrical weight and directs its light beam perpendicular to said first light beam and through the axis of said hollow cylindrical weight.

7. The sensor as claimed in claim 1, wherein said first and second optoelectronic light producing means comprise first and second light emitting diodes, respectively.

8. The sensor as claimed in claim 1, wherein:

said means for producing a sensor output signal comprises first and second light receivers, said first light receiver receiving light only from said first light producing means, and said second light receiver receiving light only from said second light producing means; and said first and second light receivers are connected in series to produce a combined light receiver output signal.

9. The sensor as claimed in claim 8, wherein:

said means for producing a sensor output signal further comprises a latch timer circuit for producing an output pulse of predetermined duration when triggered, said latch timer circuit having a trigger input; and said combined light receiver output signal, from said first and second light receivers, is coupled to said trigger input of said latch timer, thereby producing said output pulse of predetermined duration when said counterweight interferes with either of said first and said second light beams.

10. The sensor as claimed in claim 9, comprising:

a first remote switch means for shunting across said first and second light producing means to extinguish said first and second light beams, whereby said shunting simulates an interference with said light beams in order to test the operation of said acceleration sensor; and a second remote switch means for selectively manually resetting said latch timer circuit during said predetermined duration, whereby false triggering of said latch timer circuit can be ignored.

11. The sensor as claimed in claim 2, wherein the ratio of the resiliency of said fine wire helical spring to the weight of said weight is predetermined such that repeated acceleration forces applied to said acceleration sensor as a predetermined group of repeated or randomized frequencies in the range of about 2 to 25 impacts per second results in reinforced displacement of said weight, whereby said repeated acceleration forces cause interference with at least one of said light beams for magnitudes of applied acceleration forces less than that required for single acceleration impacts.

12. An acceleration sensor device, comprising:

a resiliently suspended counterweight movable in all spatial directions under the influence of an applied acceleration to said sensor device, said resiliently suspended counterweight including a resilient means and a weight; and means for detecting movement of said weight in any spatial direction and producing a sensor device output signal upon such detection; wherein the ratio of the resiliency of said resilient means to the weight of said weight is predetermined such that repeated acceleration forces applied to said acceleration sensor device at a frequency in the range of about 2 to 25 impacts per second results in reinforced displacement of said weight, whereby said repeated acceleration forces results in detecting movement of said weight for magnitudes of applied acceleration forces less than that required for single acceleration impacts.

13. The sensor device as claimed in claim 12, wherein said resiliently suspended counterweight comprises:

a fine wire helical spring member having a fixed end and a free end; and a weight coupled to said spring member free end.

14. The sensor device as claimed in claim 13, wherein:

said fine wire helical spring member defines a first spring member; and said weight comprises a tightly wound second helical spring member, said second spring member being coupled to said free end of said first spring member by the intertwining of overlapping convolutions of the two spring members.

15. The sensor device as claimed in claim 13, wherein said weight is of hollow cylindrical construction.

16. The sensor device as claimed in claim 15, wherein said helical spring member has an axis, and said hollow cylindrical weight has an axis, said helical spring member and said hollow cylindrical weight being aligned coaxially in space.

* * * * *